Feb. 7, 1961   E. J. BOURGUIGNON   2,970,843
EXPANDING ARBOR ADAPTER FOR LATHES
Filed Jan. 26, 1959
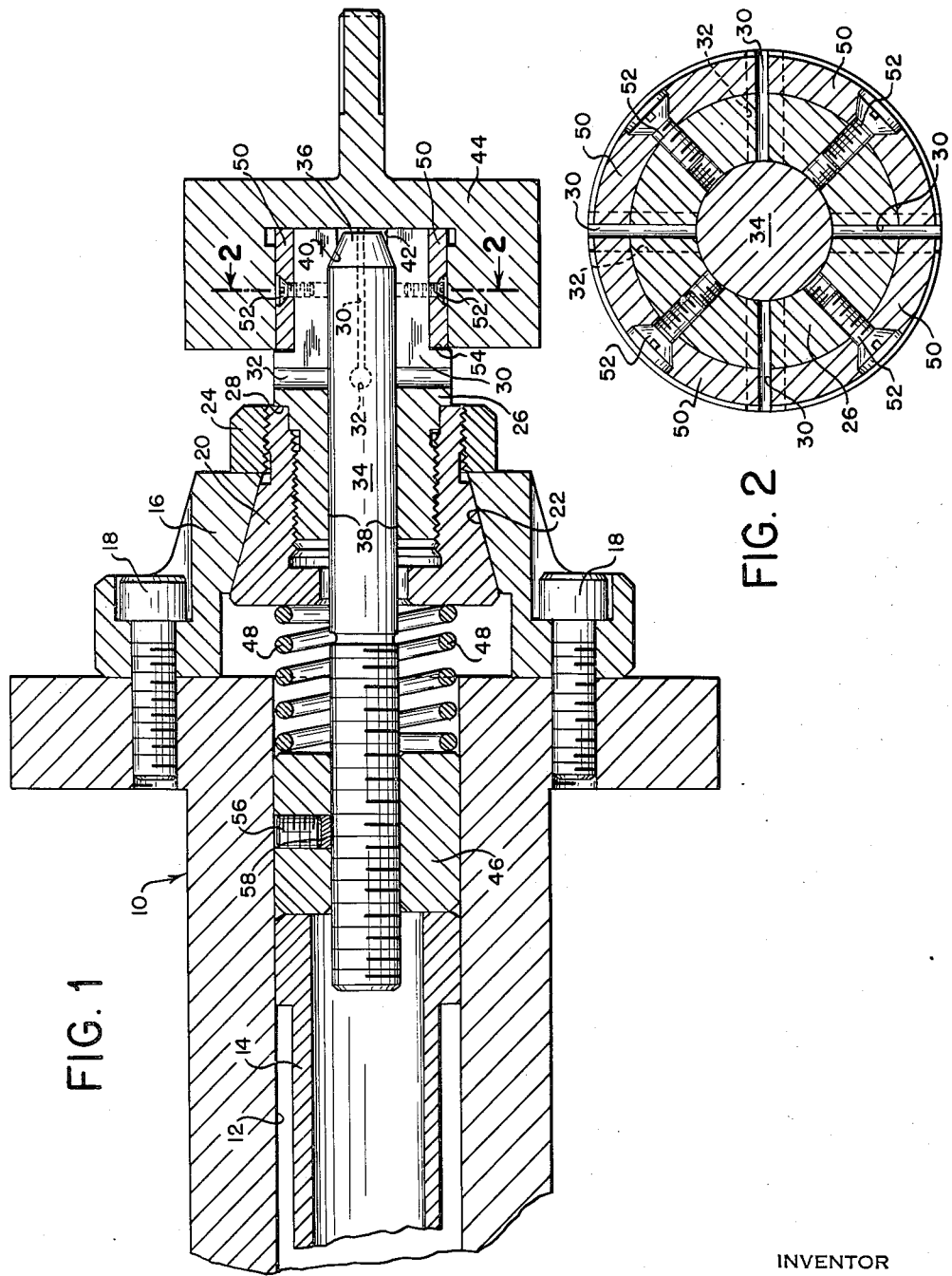
INVENTOR
Emil Joseph Bourguignon
BY
ATTORNEYS

United States Patent Office 2,970,843
Patented Feb. 7, 1961

2,970,843

EXPANDING ARBOR ADAPTER FOR LATHES

Emil J. Bourguignon, 54 Clinton Ave., Farmingdale, N.Y.

Filed Jan. 26, 1959, Ser. No. 789,073

7 Claims. (Cl. 279—2)

My invention relates to improvements in expanding arbor constructions and more particularly to an expanding arbor fitting adapter for attachment to the headstock of turret lathes for holding a workpiece to be machined.

In known types of expanding arbor constructions, the plunger is usually adapted for the particular expanding arbor which makes it necessary to change the setup on the machine to provide a different spindle or plunger suitable for a longer or shorter expanding arbor.

The primary object of the invention is, therefore, to provide an expanding arbor construction which avoids the necessity of providing structures having different length plungers.

A further object of the invention is to provide a construction which is readily adjustable and which is readily fitted to a lathe, particularly a turret lathe.

In accordance with my invention, the expanding arbor adapter construction for lathes includes an expanding arbor, a plunger for expanding the arbor and acted on by the actuating lever of the lathe on which the arbor is mounted. In this construction the expanding arbor is secured in an adapter seated in a spindle adapter attached to the lathe head and held therein by a lock nut. This arrangement of the adapter and lock nut converts the turret lathe spindle adapter into an expanding arbor adapter. Furthermore, the plunger, which is normally operated by a sleeve, is provided with an adjusting means which is set according to the length of the expanding arbor.

In a preferred construction the expanding arbor is provided with collet pads which make it easy to increase or decrease the diameter of the arbor according to the bore of the workpiece to be fitted thereon.

The arbor construction of the present invention includes other features and advantages as described more in detail hereinafter in connection with the accompanying drawings showing one embodiment of the invention.

In the drawings:

Fig. 1 is a longitudinal sectional view through an expanding arbor and adapter constructed in accordance with the invention. In this view the expanding arbor and adapter are shown attached to a turret lathe spindle nose and as carrying a workpiece; and Fig. 2 is an enlarged cross-sectional view taken on the line 2—2 through a portion of the expanding arbor and collet pads.

Referring to the drawings, the turret lathe headstock or spindle nose carrying the expanding arbor is indicated at 10 and as being provided with a bore 12 in which a reciprocable pusher tube 14 is operable. The spindle nose 10 carries a spindle adapter 16 secured by socket head cap screws 18 and concentrically arranged with respect to the bore 12. In accordance with the invention, the spindle adapter 16 in this instance is fitted with an adapter 20 for the expanding arbor. The elements 16 and 20 have complementary frusto-conical surfaces at 22, at an angle of about 14° to the axis of the structure and arranged so that the arbor adapter 20 is wedged into the spindle adapter 16 by means of a lock nut 24 threaded onto the forwardly-extending threaded portion of the arbor adapter 20, as shown.

An expanding arbor 26 is threaded into the larger, forward bore of the adapter 20 and is drawn up until a shoulder 28 thereon fits against the forward end of the adapter 20, as shown. The forward end of the expanding arbor 26 includes a collet type construction, so that its forward end is divided into quarter segments by slots 30 extending through the forward end from diametrical bores 32. A spindle type plunger 34 having a forward tapered end 36 is slidably arranged in an axial bore 38 in the expanding arbor 26, as shown. This bore extends substantially through the expanding arbor 26 to an inward tapered portion 40 extending to a smaller bore 42 at the forward end of the arbor.

The plunger 34 is adapted to be reciprocated in the expanding arbor 26 for the purpose of expanding the arbor to hold a workpiece, for example a typical workpiece 44, and to release the workpiece. Accordingly, the forward cylindrical portion of the plunger 34 is smooth and readily slidable in the bore 38 of the expanding arbor 26. The opposite end portion, however, is threaded into a plunger adjustment nut 46 having a cylindrical exterior surface slidably arranged in the bore 12 of the spindle nose 10. The pusher tube 14 of the turret lathe engages the plunger adjustment nut 46 for forcing the plunger 34 into the expanding arbor 26 to expand it into firm engagement with the workpiece 44. Any portion of the threaded end of the plunger 34 extending beyond the nut 46 is received in the tube 14. A return spring 48 mounted around the plunger 34 bears against the forward end of the nut 46 and against the back end of the arbor adapter 20. When the operating lever on the turret lathe retracts the pusher tube 14, the spring 48 retracts the plunger 34, so that the workpiece 44 is released.

The expanding arbor 26 is illustrated as being provided with pads 50 mounted on the forward end portion normally carrying the workpiece. These pads are approximate one-quarter cylindrical segments, the edges of which extend to the slots 30, as shown in Fig. 2. Each segment is secured in place by a countersunk flat head screw 52. The pads 50 may be made out of suitable soft material, such as copper or aluminum, mounted on the expanding arbor abutting a shoulder 54 and then machined down so that they fit the bore of the particular workpiece. Machining is done after a slight tension is applied to the segments of the expanding arbor by advancing the plunger 34. The segments are, therefore, held firm, while the pads are machined to the correct diameter.

In the operation of the apparatus, as described above, the pushed tube 14 is retracted to permit contraction of the expanding arbor segments after which the workpiece, for example the workpiece 44, is set on the forward end portion of the expanding arbor 26. The pusher tube 14 and plunger 34 are then advanced, so that the tapered part 36 of the plunger acts on the tapered portion 40 of the segments of the expanding arbor to expand them and firmly secure the workpiece in place. Machining or other operations can then be carried out on the workpiece.

Where it is necessary to use expanding arbors of greater length than that illustrated, the expanding arbor 26 is simply threaded out of the adapter 20 and the longer arbor threaded into place. Then the position of the nut 46 on the plunger 34 is adjusted so that the operation of the plunger with the new expanding arbor is correlated with the normal movement of the pusher tube 14. When the plunger adjustment nut 46 is threaded to the correct position, it is held in fixed position on the plunger by means of a set screw 56 which acts on a brass shoe 58, which is pressed against the threads of the plunger 34. The entire change is relatively simple to make, since the cap screws 18 are taken out and the plunger, together with the adjustment nut 46, is pulled out of the bore 12. The new expanding arbor may be threaded into the adapter 20 before the spindle adapter 16 is removed, or after it has been removed, the position of the nut 46 changed, and the adapter 16 replaced on the spindle nose 10.

The adapter 20 with its locking nut 24 provides a simple and effective construction for converting a turret lathe spindle adapter into an expanding arbor adapter, and the adjustable plunger cooperates with these elements of the construction, so that expanding arbors of various lengths may be applied to the expanding arbor adapter 20.

What I claim is:

1. In a turret lathe including a spindle nose, a spindle adapter attached to the nose and a pusher member operable in the spindle nose, the improvement comprising an expanding arbor adapter mounted in the spindle adapter of the turret lathe and secured thereto by a lock nut, an expanding arbor for holding a workpiece removably secured in the arbor adapter, a plunger spindle extending axially through the spindle adapter, the arbor adapter and into the expanding arbor, and spring means biasing the plunger spindle in the direction of the pusher member, said plunger spindle also extending into the spindle nose in operative relationship with the pusher member, whereby the plunger spindle may be forced into the expanding arbor to expand the arbor into engagement with the workpiece to be held thereby.

2. A turret lathe as claimed in claim 1, in which the pusher member is hollow and the inner end of the plunger spindle extends thereinto, and an adjustable means on and movable along the plunger spindle engaging the outer end of the pusher member.

3. In a turret lathe including a spindle nose, a spindle adpater having an inner frusto-conical surface attached to the nose and a pusher tube operable in the spindle nose, the improvement in which said frusto-conical surface slopes outwardly toward the spindle nose, an expanding arbor adapter having an exterior frusto-conical surface mounted in the spindle adapter of the turret lathe with said surfaces in engagement, a lock nut on the arbor adapter bearing against the front end of the spindle adapter, an expanding arbor for holding a workpiece removably secured in the arbor adapter and projecting forwardly therefrom, a plunger spindle extending axially through the spindle adapter, the arbor adapter and into the expanding arbor, said plunger spindle also extending into the spindle nose and freely into the pusher tube therein, and an adjustable means on and movable along the plunger spindle engaging the outer end of the pusher tube, whereby the plunger spindle may be forced into the expanding arbor by the pusher tube to expand the arbor into engagement with the workpiece to be held thereby.

4. A turret lathe as claimed in claim 3, in which the inner end portion of the plunger spindle is threaded and said adjustable means is an adjustment nut threaded on the plunger spindle and engaging the outer end of the pusher tube.

5. In a turret lathe including a spindle nose, a spindle adapter attached to the nose and a hollow pusher member operable in the spindle nose, the improvement comprising an expanding arbor adapter mounted in the spindle adapter of the turret lathe and secured thereto by a lock nut, an expanding arbor for holding a workpiece and removably secured in the arbor adapter, a plunger spindle extending axially through the spindle adapter, the arbor adapter and into the expanding arbor, said plunger spindle also extending into the spindle nose and into the pusher member, the inner end portion of the plunger spindle being threaded, and a nut threaded on the threaded inner end portion of the plunger spindle engaged by the outer end of the pusher member for adjusting the effective length of the plunger spindle, the pusher member being adapted to force the plunger spindle into the expanding arbor to expand the arbor into engagement with the workpiece to be held thereby.

6. In a turret lathe including a spindle nose, a spindle adapter attached to the nose and a hollow pusher member operable in the spindle nose, the improvement comprising an expanding arbor adapter mounted in the spindle adapter of the turret lathe and secured thereto by a lock nut, an expanding arbor removably secured in the arbor adapter for holding a workpiece, a plunger spindle extending axially through the spindle adapter, the arbor adapter and into the expanding arbor, said plunger spindle also extending into the spindle nose and into the pusher member, the inner end portion of the plunger spindle being threaded, a nut threaded on the threaded inner end portion of the plunger spindle engaged by the outer end of the pusher member for adjusting the effective length of the plunger spindle, the pusher member being adapted to force the plunger spindle into the expanding arbor to expand the arbor into engagement with the workpiece to be held thereby, and a compression spring around the plunger spindle between the nut thereon and the back of the arbor adapter for retracting the plunger spindle in the expanding arbor when the pusher member is retracted.

7. In a turret lathe including a spindle nose, a spindle adapter attached to the nose and a pusher member operable in the spindle nose, the improvement comprising an expanding arbor adapter mounted in the spindle adapter of the turret lathe and having a forwardly-extending threaded portion projecting axially from the front of the spindle adapter, a lock nut threaded on said threaded portion and bearing against the front of the spindle adapter, said spindle adapter and arbor adapter having complementary engaging frusto-conical surfaces sloping outwardly from front to back and held in wedging engagement by the lock nut, an expanding arbor removably secured in the arbor adapter for holding a workpiece, a plunger spindle extending axially through the spindle adapter, the arbor adapter and into the expanding arbor, said plunger spindle also extending into the spindle nose in operative relationship with the pusher member, whereby the plunger spindle may be forced into the expanding arbor to expand the arbor into engagement with the workpiece to be held thereby.

References Cited in the file of this patent

UNITED STATES PATENTS

| | | |
|---|---|---|
| 2,377,991 | Carlson | June 12, 1945 |
| 2,435,480 | Tuttle | Feb. 3, 1948 |
| 2,494,899 | Ross | Jan. 17, 1950 |
| 2,548,978 | Jelinek | Apr. 17, 1951 |